United States Patent [19]
DiBenedetto

[11] 3,890,482
[45] June 17, 1975

[54] APPARATUS FOR WELDING TOGETHER SUBSTANTIALLY VERTICALLY EXTENDING PIPE SECTIONS

[75] Inventor: Anthony J. DiBenedetto, Metairie, La.

[73] Assignee: Gurtler Hebert & Co., Inc., New Orleans, La.

[22] Filed: Apr. 2, 1973

[21] Appl. No.: 346,892

Related U.S. Application Data

[63] Continuation-in-part of Ser. No. 22,161, March 24, 1970, Pat. No. 3,727,025.

[52] U.S. Cl............. 219/73; 219/60 A; 219/125 R; 219/126
[51] Int. Cl............................................. B23k 9/18
[58] Field of Search......... 219/60 A, 73, 126, 125 R

[56] References Cited
UNITED STATES PATENTS

| | | | |
|---|---|---|---|
| 2,227,194 | 12/1940 | Moise et al. | 219/60 A |
| 2,866,078 | 12/1958 | Ballentine, Jr. et al. | 219/73 X |
| 2,906,851 | 9/1959 | Kitrell | 219/60 A |

Primary Examiner—J. V. Truhe
Assistant Examiner—N. D. Herkamp

[57] ABSTRACT

An apparatus for welding together substantially vertically extending pipe sections comprising at lease one weld metal depositing means mounted on a carriage, and a support ring fastened about one of the pipe sections. The weld metal depositing means is movable around the pipe sections on the ring. Each weld depositing means has a welding electrode which is movable in four different degrees in order to allow it to be accurately positioned with respect to the weld groove so that the characteristics of the weld metal being deposited thereby can accurately be controlled. Electrical power is supplied to the welding electrode and to the various drive motors through annular electrodes mounted on the support ring. A flux trough having a deformable side portion allows the electrode more freedom of movement. The flux trough can also be equipped with means for assisting in the alignment of the welding carriage support ring around the pipe sections.

15 Claims, 21 Drawing Figures

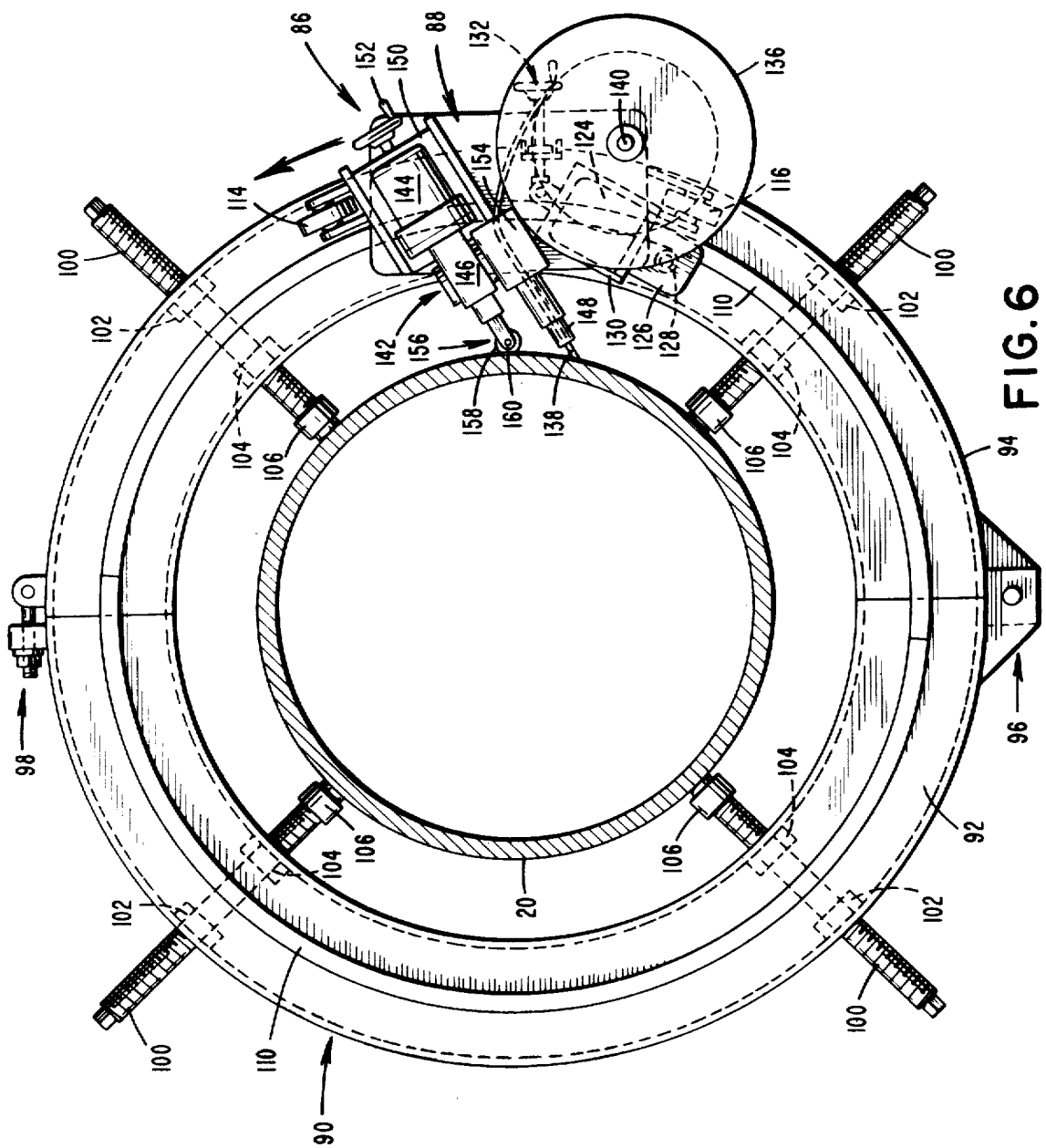

3,890,482

APPARATUS FOR WELDING TOGETHER SUBSTANTIALLY VERTICALLY EXTENDING PIPE SECTIONS

RELATED APPLICATION

This application is a continuation-in-part of application Ser. No. 22,161, filed Mar. 24, 1970, now U.S. Pat. No. 3,727,025.

BACKGROUND OF THE INVENTION

1. Field of the Invention

This invention relates generally to apparatus for welding together pipe sections, and more particularly to apparatus for welding together substantially vertically extending pipe sections in end-to-end relationship.

2. Description of the Prior Art

The drilling of wells frequently requires that a length of pipe be inserted into the earth for isolating at least the upper portion of a well from the surrounding environment ot prevent both the materials introduced into the well, i.e., drilling and mud and cement, and the materials removed from the well, i.e., petroleum, gas and water, from escaping into and contaminating the surrounding environment. Pipe of this type is known in the art as conductor pipe. In order to drill an off-shore well, a substantial length of conductor pipe must extend from a drilling rig through the water beneath the rig to the ocean floor, and into the ocean floor a substantial distance. Typically, conductor pipe is 24 to 36 inches in diameter, and has side wall thicknesses of the order of 2 inches. Because conductor pipe must be transported, it is manufactured in relatively short sections, i.e., sections of 40 feet in length, which sections are then sequentially welded together in end-to-end relationship. In off-shore rigs, a similar pipe is used as legs for the drilling platform. The legs are assembled of sections welded together in the same manner as the conductor pipe, and then pounded into the earth beneath the water, usually at an angle to the vertical. This angular disposition poses additional problems in welding, dealing chiefly with the effect of gravity upon the puddle of weld metal.

Generally, conductor pipe is pounded into the earth by means of a pile driver or the like. As the conductor pipe is driven into the ground, additional sections are welded to the top of the length of pipe, and the drilling continues. The conductor pipe thus assembled from welded sections must be able not only to withstand the pounding of the drilling operation, but also the high gas and liquid pressures, without leakage. Therefore, the welded joints must be of very high quality. Furthermore, it is necessary to accomplish the joining of adjacent sections of pipe in a speedy manner, so as not to delay any more than necessary the costly drilling process.

The welds that join the pipe sections together are accomplished under adverse conditions, and must be perfectly done. Wind and waves act on the pipe as it is being welded, and the pounding of the rig hammers stresses the welds during driving of the pipe. Once installed, the welds must remain perfect under years of internal pressure from oil and gas. In addition, the cost of a drilling operation is directly related to the number of hours that a drilling rig is in operation. Therefore, the emphasis is also on speed, which adds to the possibility of error. The prior art manual and machine techniques have not been able to overcome the above problems, for a number of reasons.

First of all, the weld metal deposition rate of manual welding methods is relatively low, for example, 6 lbs. of weld metal per man-hour. Since the conductor pipe is of relatively large diameter, and the walls are quite thick, a considerable amount of weld metal must be deposited in the weld groove in order to properly weld the adjacent sections together. With manual welding methods considerable time is consumed in the welding operation, even if several welders are working simultaneously. Secondly, in manual welding operations there is quite often considerable variance in quality between different portions done by the same welder, and certainly between portions done by different welders, resulting from a number of factors, including the varying degrees of expertise and dedication, and from the different styles and methods which the individual welders use to accomplish a specific task. Furthermore, personnel employed in manual welding are frequently required to work for extended periods of time due to the economic necessity of installing the conductor pipe as quickly as possible, and are therefore subject to fatigue, resulting in decreases in both the uniformity and the quality of the welds produced. Therefore, each weld must be checked for quality before it is moved from the welding station. A poor weld must be repaired, if possible, or cut out and redone. This is time-consuming, and therefore expensive. An undetected poor weld could jeopardize the entire drilling operation, so chances cannot be taken.

Prior art welding machines, while capable of depositing more pounds of weld metal per hour than manual welders, have typically been cumbersome and complicated mechanisms ill suited for quality of work under the conditions imposed by this type of welding. For example, they usually require a relatively large operating crew. Often, the methods and techniques required for their proper operation are so complicated as actually to be detrimental to the accomplishment of the two objectives: speed and quality. The inability to properly and accurately position the welding electrode, for example, often means that the most desirable bead simply cannot be laid, or that compensation cannot properly be made for peculiaraities that appear during a welding pass. With some machines, the weld metal depositing means cannot continuously circle the pipe because of a basic design deficiency in the support ring or in the manner in which electrical power is supplied. Thus, in many cases a plurality of weld metal depositing means cannot simultaneously be used. The best measure of the deficiencies in these prior art machines has been their lack of commercial acceptance.

SUMMARY OF THE INVENTION

The present invention eliminates the foregoing problems by providing an apparatus for welding together substantially vertically extending pipe sections quickly with welds of uniformly high quality. Basically described, the apparatus of the invention comprises at least one welding unit including a movable carriage, carriage drive means, weld metal depositing means having an electrode positionable in four planes, welding wire and flux supply systems, and associated controls. The welding units are mounted on a support ring fastened about the pipe sections, and are movable about the pipe sections on a track carried by the support ring. Electrical power supply means are also carried by the support ring. Conventional welding techniques can be used, such as submerged arc and open arc. In cases where it is necessary to utilize a flux trough adjacent to the weld groove, a flux trough having a novel deformable side portion is utilized, so as not to inhibit the positioning of the electrode.

The apparatus of this invention permits welds of uniformly high quality to be obtained at relatively high weld metal deposition rates, for example, 20 lbs. of weld metal per hour with a single welding unit. Due to the ability to precisely position the electrode of the weld depositing means, and the ability to easily reposition the electrode in a precise manner during each welding pass, the weld metal bead characteristics can be precisely controlled. This invention is extremely efficient from the standpoint of speed and quality. The invention lends itself well to use with virtually any type of weld groove configuration, such as those illustrated in FIGS. 2–5.

The apparatus of this invention is normally utilized in a method which involves forming a bevel at one end of at least one of the two pipe sections to be joined in end-to-end relationship, so that the abutting pipe sections define a weld groove or space. The means for depositing weld metal is moved around the sections to deposit weld metal in the weld groove beginning at the inner surfaces of the pipe sections and working progressively therearound and outwardly to fill the weld space with weld metal, while maintaining a controlled relationship between the weld metal depositing means and the weld metal deposited thereby, and the base metal of the pipe sections. A preferred method of operating this apparatus is set forth in my copending application Ser. No. 22,161, filed Mar. 24, 1970.

BRIEF DESCRIPTION OF THE DRAWINGS

FIG. 6 is a top view of a first embodiment of the welding apparatus of this invention.

DESCRIPTION OF THE PREFERRED EMBODIMENT

Figure 1:
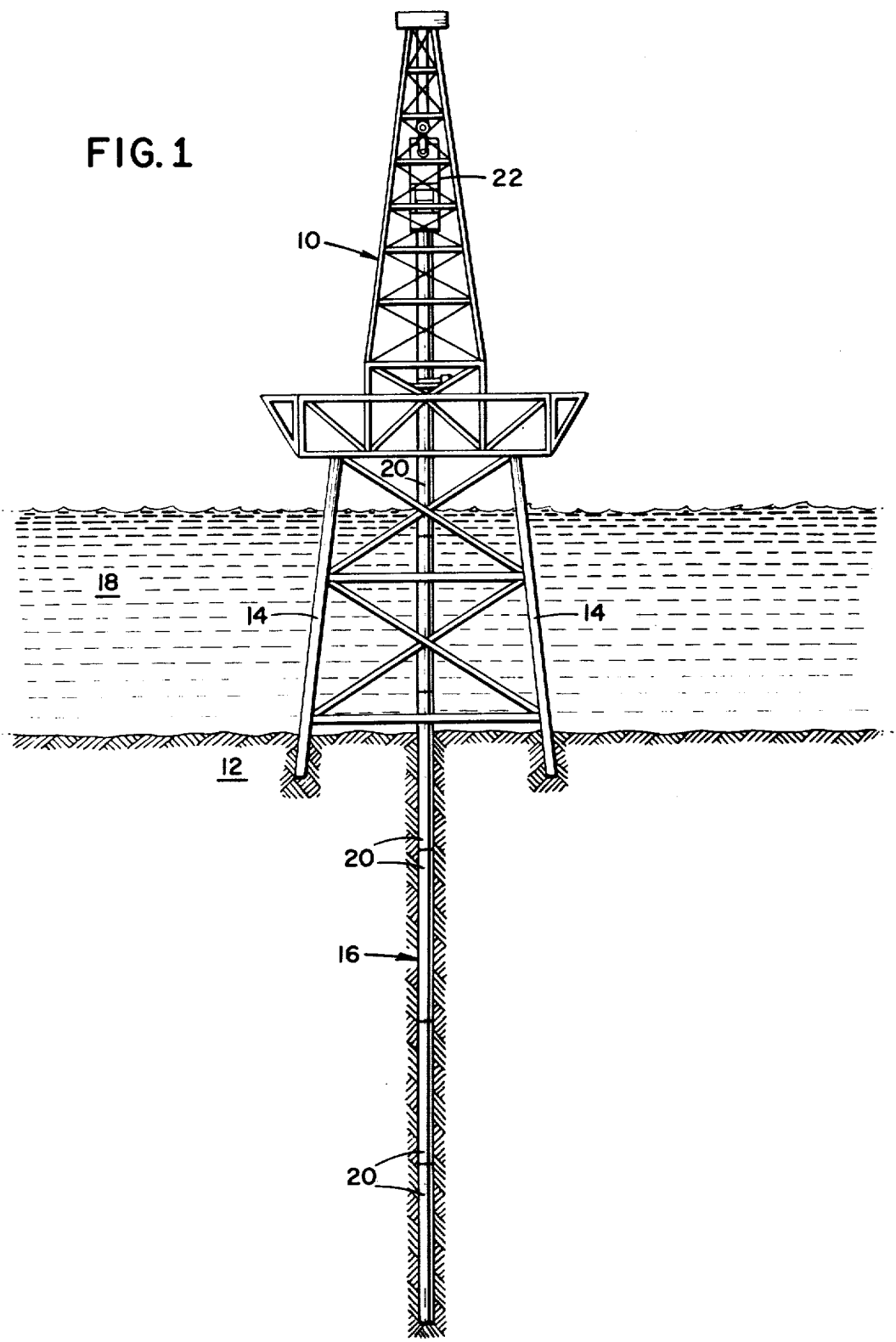
FIG. 1 is a diagramatic view of an off-shore drilling rig showing the relationship between the conductor pipe, the rig legs, the water beneath the rig and the ocean floor.

An off-shore drilling rig is shown in FIG. 1, designated generally by reference numeral 10. Rig 10 is positioned for drilling a petroleum well in the ocean floor 12, and is supported by a plurality of rig legs 14 driven into ocean floor 12. A conductor pipe 16 is inserted through the rig floor through the water 18 beneath the rig floor and thence into the ocean floor 12 for a substantial distance. Conductor pipe 16 serves as a structural conduit through which the material employed in drilling the well are introduced into the well. After the well has been drilled, the conductor pipe serves as the outer structural member of a conduit through which petroleum and other materials, such as gas, are received from the well.

The conductor pipe is transported to the rig 10 in relatively short sections 20. Generally, each section is 40 feet in length and is about 2 to 3 feet in diameter. Sections 20 are sequentially welded together in end-to-end relationship to form the length of conductor pipe 16 as required. After each section 20 has been welded to the length of conductor pipe 16 already extending downwardly from the rig, conductor pipe is driven downwardly the length of the newly added section. This process is repeated until the lower end of conductor pipe has reached the desired depth. A rig hammer 22 is generally employed for driving conductor pipe into ocean floor 12.

Figure 2:
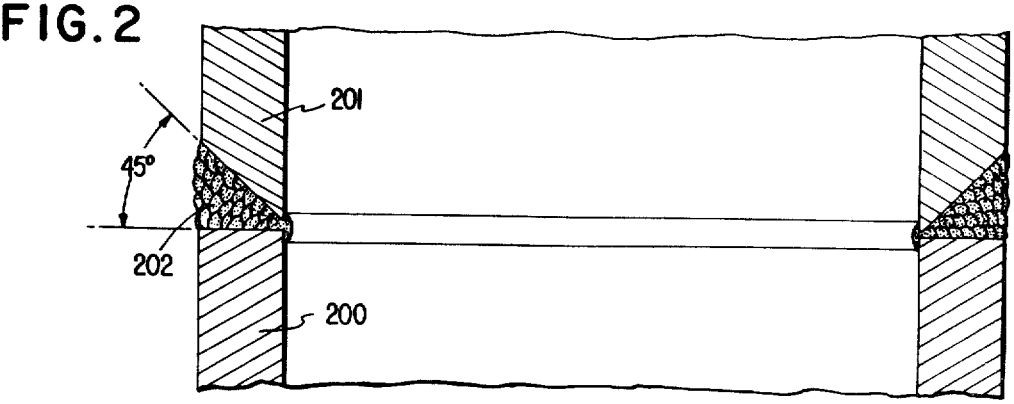
FIG. 2 is a sectional view of two substantially vertically extending adjacent pipe sections, showing one type of weld groove which may be employed with the apparatus of this invention.
Figure 3:
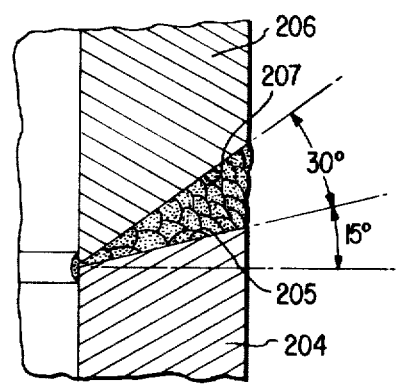
FIG. 3 is a sectional view of another type of weld groove which may be employed with the apparatus of this invention.
Figure 5:
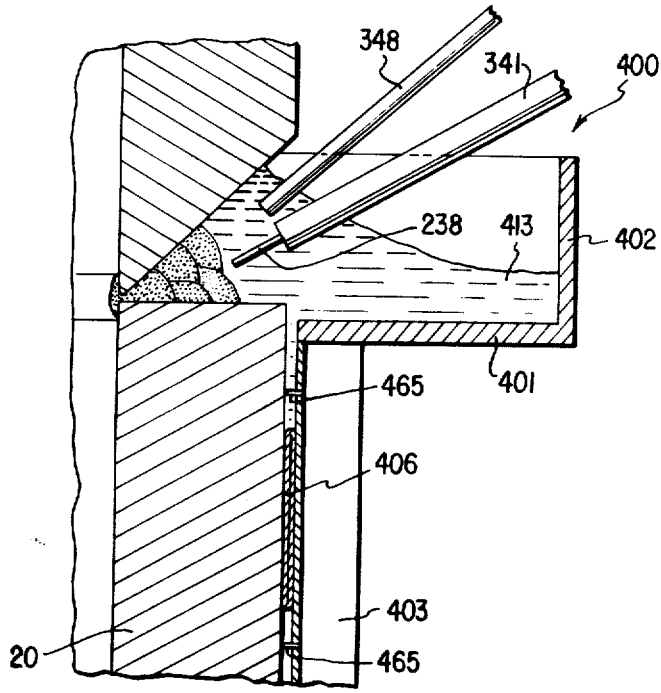
FIG. 5 is a sectional view of the weld groove of FIG. 2, showing the relationship between the various elements used in the submerged arc type of welding.
Figure 4:
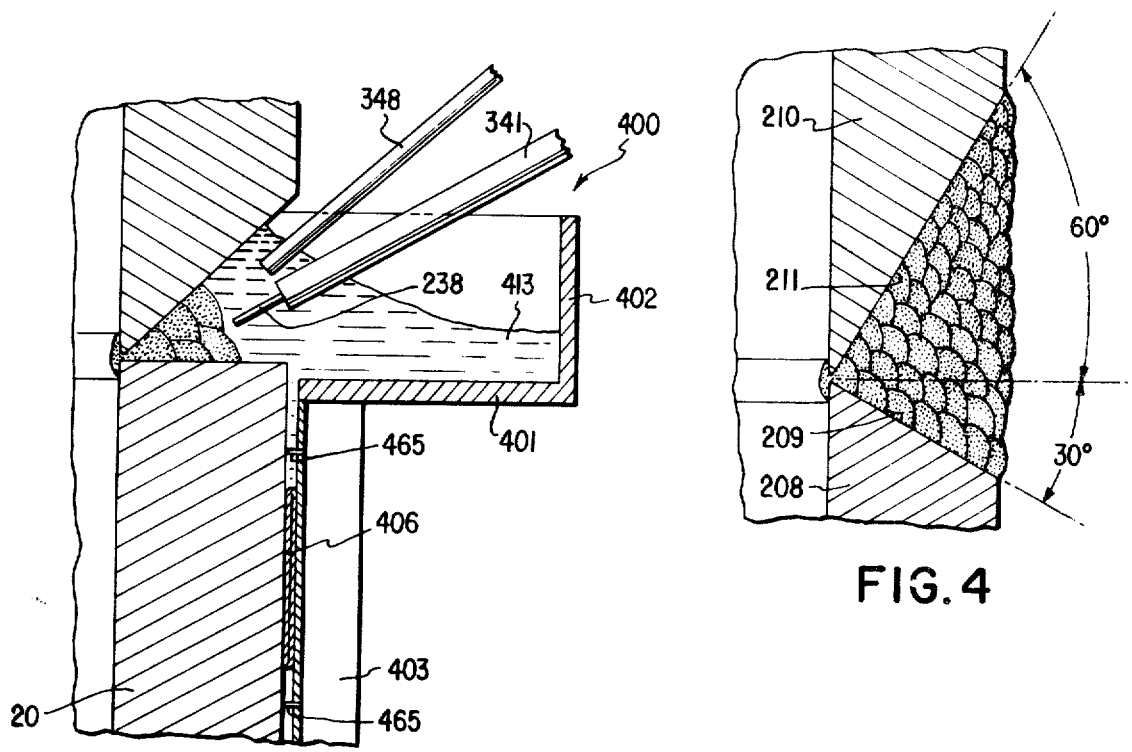
FIG. 4 is a sectional view of still another type of weld groove which may be employed with the apparatus of this invention.

Typically, a weld groove is created at the abutting ends of adjacent pipe sections, and one of the features of this invention is the ability to position the welding electrode so that the exact type of weld bead can be properly manufactured to suit the particular weld groove in a particular situation. For example, in FIG. 2 there is shown in cross section a first pipe section 200 and a second pipe section 201 which are to be welded together in end-to-end relationship. To provide this type of weld groove, the upper end of section 200 is squared off to form an angular planar surface oriented substantially perpendicular to the longitudinal axis of the section. Pipe section 201 is beveled to form a conical surface inclined inwardly and downwardly at an angle at approximately 40° to the longitudinal axis of the section. Prior to welding, sections 200 and 201 are vertically aligned with each other so that the beveled end of section 201 forms a weld groove into which weld metal 202 is deposited. FIG. 3 illustrates another weld groove in which the upper portion of a lower pipe section 204 has a beveled surface 205 inclined inwardly at an angle of approximately 15° to a plane perpendicular to the longitudinal axis of the section, while the lower end of the upper pipe section 206 has a beveled surface 207 inclined outwardly at an angle of approximately 45° to the longitudinal axis of the pipe section. Beveled surfaces 205 and 207 cooperate to form a downwardly oriented welding groove having an angular entrance of 30°. FIG. 4 shows another weld groove defined by a lower pipe section 208 having an outwardly inclined beveled surface 209 at an angle of approximately 30° to a plane perpendicular to the longitudinal axis of section 208, and an upper pipe section 210, having an outwardly inclined beveled surface at an angle of approximately 60° to a plane perpendicular to the longitudinal axis of section 210. To facilitate the alignment of two substantially vertically extending pipe sections, a backing strip (not shown) may be positioned about the inner surfaces of the section at the welding space defined between the adjacent ends thereof. As an introduction to the description of this invention, the reader's attention is directed to FIG. 5, wherein the required relationship between several of the key elements is shown. The weld groove is defined in cross section by an upper end surface on pipe section 21 and a lower beveled end surface on pipe section 20. A flux trough 400 having a floor 401 and side 402 is mounted adjacent to the weld groove, containing a supply of flux 413. The actual welding is carried on beneath the surface of the flux 413, in the known manner. Flux is continually deposited by a flux delivery pipe 348. The welding electrode 341 is positioned within the flux 413, and the weld wire is delivered through electrode 341 in the known manner to form a weld wire tip 238. An arc is established between weld wire tip 238 and the base metal or the previously deposited weld metal. A number of weld beads have been placed, including a root pass bead and a number of fill beads. In order to accurately place each one of the weld beads, it is necessary to establish a particular spacing and angular relationship between the welding electrode and the base metal and previously deposited weld beads.

Figure 7:
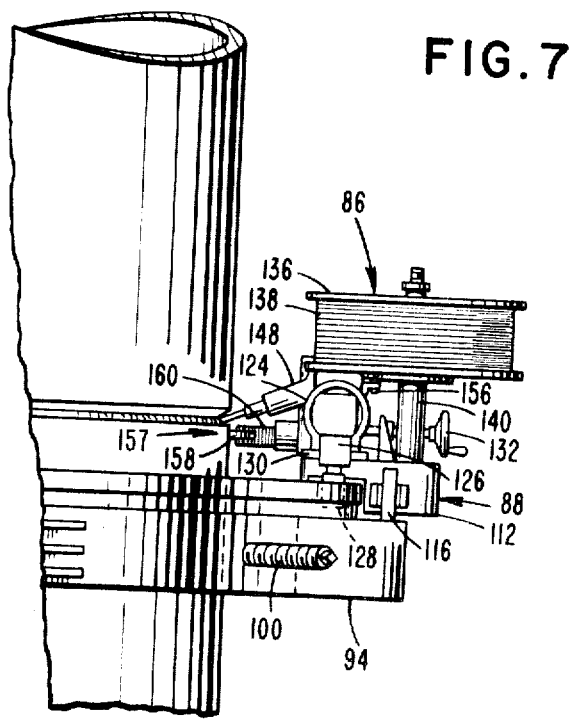
FIG. 7 is a side view of the carriage and the means for depositing weld metal of the embodiment of FIG. 6.
Figure 8:
FIG. 8 is an enlarged sectional view of a portion of the embodiment of FIG. 6, showing in detail the electrical power supply means.

The first embodiment of the apparatus of the invention is illustrated in FIGS. 6-8, and includes a welding unit 86. Welding unit 86 includes a movable carriage 88 and a means for supporting carriage 88 for movement about two substantially vertically extending adjacent pipe sections to be welded together, and particularly two adjacent conductor pipe sections. The supporting means comprises a split ring 90 formed by two arcuate channel members 92 and 94 which are pivotally interconnected by a hinge 96. Members 92 and 94 are adapted to be positioned about the lower of the two sections 20 to be welded together and releasably locked together by a quickrelease latch 98.

Ring 90 is secured to the lower pipe section by a plurality of clamping bolts 100. Bolts 100 threadably engage nuts 102 and 104 affixed to the inner and outer lateral sides, respectively, of channel members 92 and 94 interiorly of the members. Rotatably attached to the inner end of each bolt 100 is a clamping die 106 adapted to engage the outer surface of the lower pipe section.

Integrally affixed to the top of member 92 and 94 is a flange 108 having a rectangular bead 110 at the top thereof. Carriage 88 is supported for movement about the pipe sections on the upper surface of members 92 and 94. The carriage includes an open-bottomed base 112 to which is connected a forward wheel 114 and a rear wheel 116 which are adapted to contact the upper surfaces of members 92 and 94 outside flange 108. Also connected to base 112 is an intermediate wheel 118 which is adapted to contact the upper surfaces of members 92 and 94 inside flange 108. In addition, a pair of guide wheels 120 and 122 are mounted on the underside of the top of carriage base 112 and engage bead 110 on either side thereof.

Welding unit 86 also includes means mounted on carriage 88 for moving the carriage, In this first embodiment a friction drive arrangement is illustrated, although other types can be used. Direct gear drive is herein illustrated with regard to the second and third embodiments of the invention. The carriage drive means includes an electric motor 124 which is drivingly connected to a speed reduction unit 126. Secured to the output shaft of unit 126 is a resilient capstan roller 128 which is adapted to frictionally engage the inner surface of bead 110 for moving carriage 88.

Motor 124 is attached to a plate 130 and the latter is pivotally mounted on the upper surface of carriage base 112. A handwheel operated adjustment mechanism 132 is connected to plate 130 and base 112 for pivoting motor 124, speed reduction unit 126 and roller 128 with respect to the base, so that roller 128 may be firmly engaged with the inner surface of bead 110.

Also mounted on carriage base 112 is a means for depositing weld metal in a welding space 134 defined between the adjacent ends of the pipe sections. The depositing means may utilize any conventional weld metal deposition technique, for example open arc, submerged arc, shielded arc, gas or atomic-hydrogen. The depositing means of the first embodiment of the apparatus utilizes an open arc technique and includes a reel 136 on which is wound a roll of electrode wire 138. Reel 136 is mounted on carriage base 112 for rotation about a substantially vertical axis by a shaft 140. From reel 136, wire 138 is inserted into a conventional wire feed mechanism 142. Mechanism 142 includes an electric motor 144 which is drivingly connected to a pair of wire feed rolls (not shown) by a speed reduction unit 146. The wire feed wheels feed wire 138 through an electrode, which positions the wire for deposition into space 134.

Mechanically interposed between wire feed mechanism 142 and carriage base 112 is a means for adjusting the radial distance of electrode 148 from the pipe sections that is, from the base metal or the previously deposited weld metal. Such means comprises a plate 150 which is slidably mounted on the upper surface of base 112 and a handwheel operated adjustment mechanism 152 connected to plate 150 and base 112 for adjusting the horizontal position of the plate. Wire feed motor 144 is attached to the upper surface of plate 150 so that the wire feed mechanism 142 is movable with the plate.

Also mounted on carriage 88 is a means for adjusting the angle of electrode 148 with respect to a plane perpendicular to the pipe axis, herein called the vertical attitude of electrode 148. Such means comprises a housing 154 which encloses the wire feed rolls of mechanism 142 and to which nozzle 148 is attached. Housing 154 is rotatably mounted on a flange disposed about the wire feed rolls and may be locked in position by a clamping bolt 156. By rotating housing 154, the vertical attitude of electrode 148 may be adjusted.

By combining a radial spacing adjustment, effected by manipulating mechanism 152, with a vertical attitude adjustment, effected by rotating housing 154, it is further possible to adjust the vertical position of electrode 148.

Also mounted on carriage 88 is a means for adjusting the angle of the electrode 148 with respect to a radius of the pipe, herein called the horizontal attitude of electrode 148. For this purpose, plate 150 is adjustably pivotally mounted on the upper surface of carriage base 112 so that the horizontal attitude of mechanism 142, including electrode 148, may be adjusted.

The radial spacing between the tip of electrode wire 138 and the previously deposited weld metal and the base metal of the pipe sections is an important parameter in controlling the characteristics of the weld metal beads. Generally, it is desirable to keep this spacing substantially constant, and thus welding unit 86 includes means for compensating for out of round pipe sections. For example, if the pipe section is out of round, the aforementioned separation will vary unless a means to change the horizontal position of mechanism 142 is provided.

For this purpose, welding unit 86 additionally includes a compensating means mounted on carriage 88 for sensing irregularities in the shape of the pipe section and changing the horizontal position of electrode 148 in response to any such irregularities, so that the spacing between the nozzle and the previously deposited weld metal and the base metal will remain substantially constant for any adjusted position of plate 150. Such compensating means comprises a spring-biased roller mechanism 157. Mechanism 157 includes a roller 158 which is mounted at the inner end of an arm 160 and which contacts the outer surface of the lower section 20 just below the welding space. Arm 160 is spring-biased inwardly toward the pipe section so that roller 158 remains in contact with the section irrespective of any irregularities in the shape thereof. The outer end of arm 160 is operatively connected to plate 150 by any conventional mechanical linkage so that arm 160 and plate 150 will be horizontally displaced in response to any irregularities in the shape of the pipe section. Thus, the separation between electrode 148 and the previously deposited weld metal and the base metal will remain constant from any adjusted position of plate 150.

While in the first embodiment of the apparatus the various means for adjusting the position of electrode 148 comprise conventional mechanical linkage systems, any one or more of such systems may be replaced by more sophisticated electro-mechanical systems.

Welding unit 86 additionally includes means for supplying electrical current to motors 124 and 144 and for establishing a welding arc between electrode wire 138 and the adjacent ends of the pipe sections. As seen in FIG. 8, such means includes a strip of insulation 162 affixed to the inner side of flange 108. Three vertically superposed bus bars 164 are affixed to the inner side of strip 162 and are contacted by three correspondingly vertically superposed brushes 166. Brushes 166 are carried by a flange 168 affixed to the underside of the top of carriage base 112. Leads 170 are connected between brushes 166 and motors 124 and 144 and a suitable contact device contacting wire 138. The pipe section serves as a common ground for motors 124 and 144 as well as for the welding arc.

Figure 9:
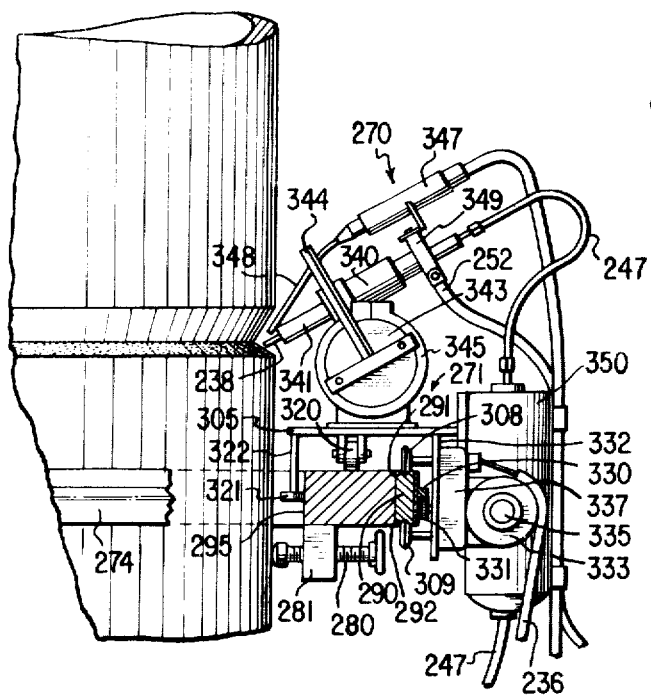
FIG. 9 is an elevational view of the welding unit of the second embodiment of the apparatus of this invention.
Figure 10:
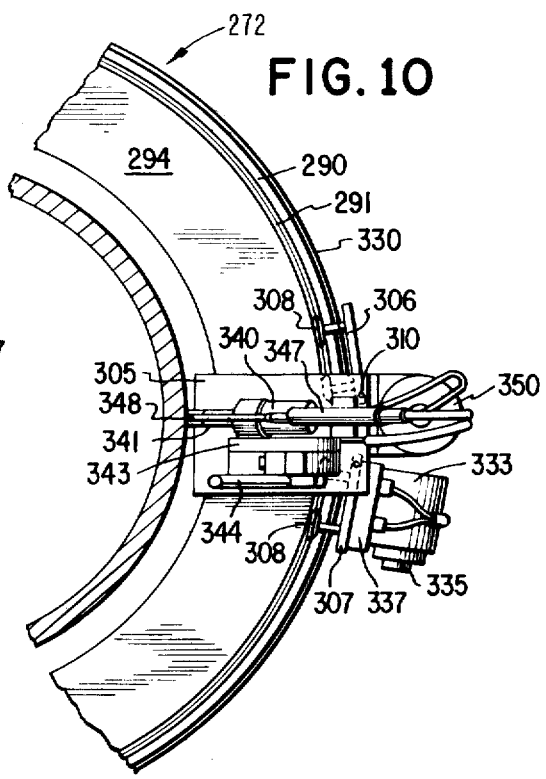
FIG. 10 is a top view of the embodiment of FIG. 9.

The welding unit of a second embodiment of the apparatus of the invention is shown in FIGS. 9 and 10, as designated by reference numeral 270. Unit 270 includes a movable carriage 271 and means for supporting the carriage for movement about two substantially vertically extending adjacent pipe sections to be welded together. The supporting means comprises a split ring 272 such as that described above in conjunction with the first embodiment of the invention.

Integrally affixed to the peripheries of the support ring 272 is a support track 290 having an upper wheel receiving groove 291 and a lower wheel receiving groove 292 about the entire circumference thereof. Ring 272 also defines a load supporting surface 294 on the upper portions thereof, and a load guide surface 295 on the inner portions thereof.

A carriage 271 is supported for movement on the upper surfaces of ring 272. The carriage includes an open-bottomed base 305 to which is connected an articulated drive mechanism support. Such support includes a pair of plates 306 and 307, each of which is rotatably support a pair of upper guide wheels 308 and a pair of lower guide wheels 309 which engage and move in guide tracks 291 and 292, respectively. Plates 306 and 307 are each individually pivotally attached to the underside of base 305 by a bolt 310 at the respective inner ends thereof, so that irregularities in the roundness of members 273 and 274 can be accommodated. The use of an articulated support for the drive mechanism also allows welding unit 270 to be used on tracks having different curvatures than that of ring 272, or on straight tracks, for example, when welding flat or slightly curved plates.

Carriage 271 also is provided with at least one main supporting wheel 320 mounted on the underside of base 305 and operating on support surface 294. In addition, at least one guide wheel 321 is rotatably connected to the underside of base 305 by a shaft 322, and engages guide surface 295 to assist in guiding and accurately positioning carriage 271 with respect to ring 272.

Disposed about the periphery of ring 272 is a gear rack 330 which is engaged by a drive gear 331 rotatably mounted on plate 307 and driven by an electric drive unit 333. Unit 333 includes a speed control 335 which is immediately accessible to the operator so that the rate of which carriage 271 traverses ring 272 may be regulated easily. Power for unit 333 is received from base 226 through one of cables 252 and a junction box 337.

Mounted on the upper surface of base 305 is a means 340 for depositing weld metal, including an electrode 341 from which protrudes the end of welding wire 238. Power for depositing means 340 is provided through one of cables 252 connected to the weld control unit 230 on base 226. Welding wire is supplied from reel 237 through wire conduit 247. A conventional wire feed mechanism 350 feeds wire 238 to nozzle 341 at a predetermined rate. Depositing means 340 also includes a means 343 for adjusting the vertical attitude of electrode 341. Adjusting means 343 includes a handle 344 and a locking ring 345.

Attached to and movable with depositing means 340 is a means 347 for depositing welding flux. Such means include a tube 348 for positioned above nozzle 341 and terminating just above wire 238 as the wire extends from the electrode 341. A bracket 349 fixedly attached flux depositing means 347 to electrode 341. Flux is supplied from flux drum 231 on base 226 through flux supply conduit 251. The flux can be moved from drum 231 to tube 348 by any suitable pneumatic carrier, such as compressed air.

A means for adjusting the radial position of nozzle 341 is not shown in FIGS. 9 and 10, but can be provided if desired.

Two carriages 271, each having welding electrodes, can be used in any of the embodiments of this invention, although only one carriage is shown in the drawings, so that the welding operation may be completed as quickly as possible.

Figure 11:
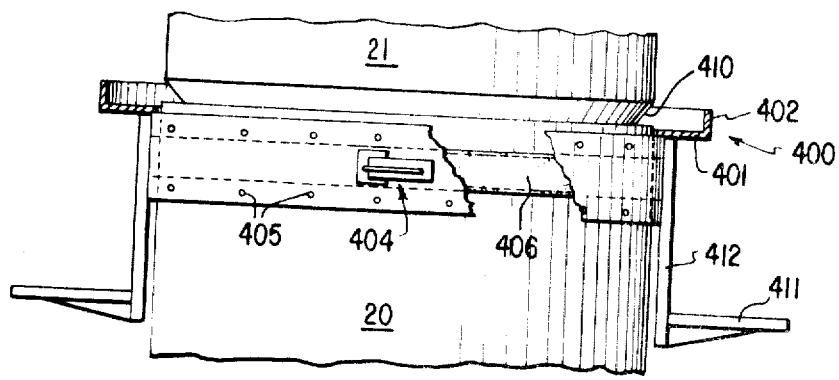
FIG. 11 is an elevational view, partially in section, of a flux trough of this invention.

Illustrated in FIG. 11 is a flux trough 400, comprising a floor 401, an outer wall 402, and a mounting band 403 having a quick-release fastener 404. Band 403 has a plurality of inwardly facing pins 405 disposed in two rows about the interior thereof. Between the two rows of pins 405 is interposed an asbestos seal 406 to prevent any liquid flux from escaping inwardly from flux trough 402 and running down the outside of the lower pipe section 20. Flux dam 400 is positioned about the lower pipe section adjacent a welding space 410 defined between the pipe sections 20 to contain a pool of liquified flux used in a welding operation which utilizes the submerged arc technique. Flux dam 400 provides an added advantageous feature by incorporating a plurality of pads 411 for aligning the support rings. Pads 411 are individually connected to band 403 by rods 412. Rods 412 are of such length as to space pads 411 a precise distance from welding space 410. Flux dam 400 is installed with flux trough 401 positioned immediately beneath welding space 410. The alignment of ring 272 is greatly facilitated if flux dam 400 is first installed, for ring 272 is then simply placed on pads 411, and then clamped onto the lower pipe section as explained above.

Figure 12:
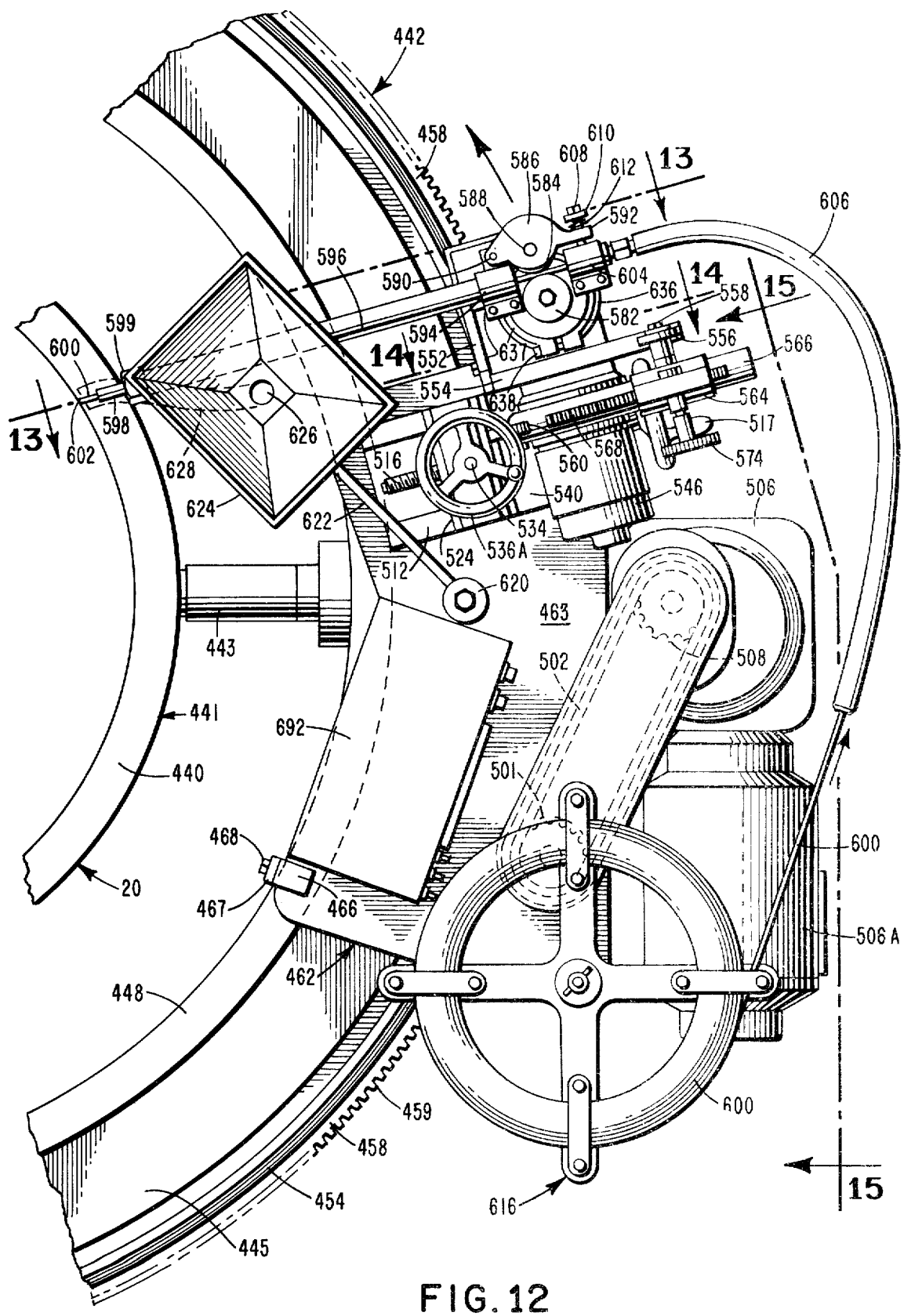
FIG. 12 is a top plan view of a third embodiment of a welding apparatus of this invention.
Figure 18:
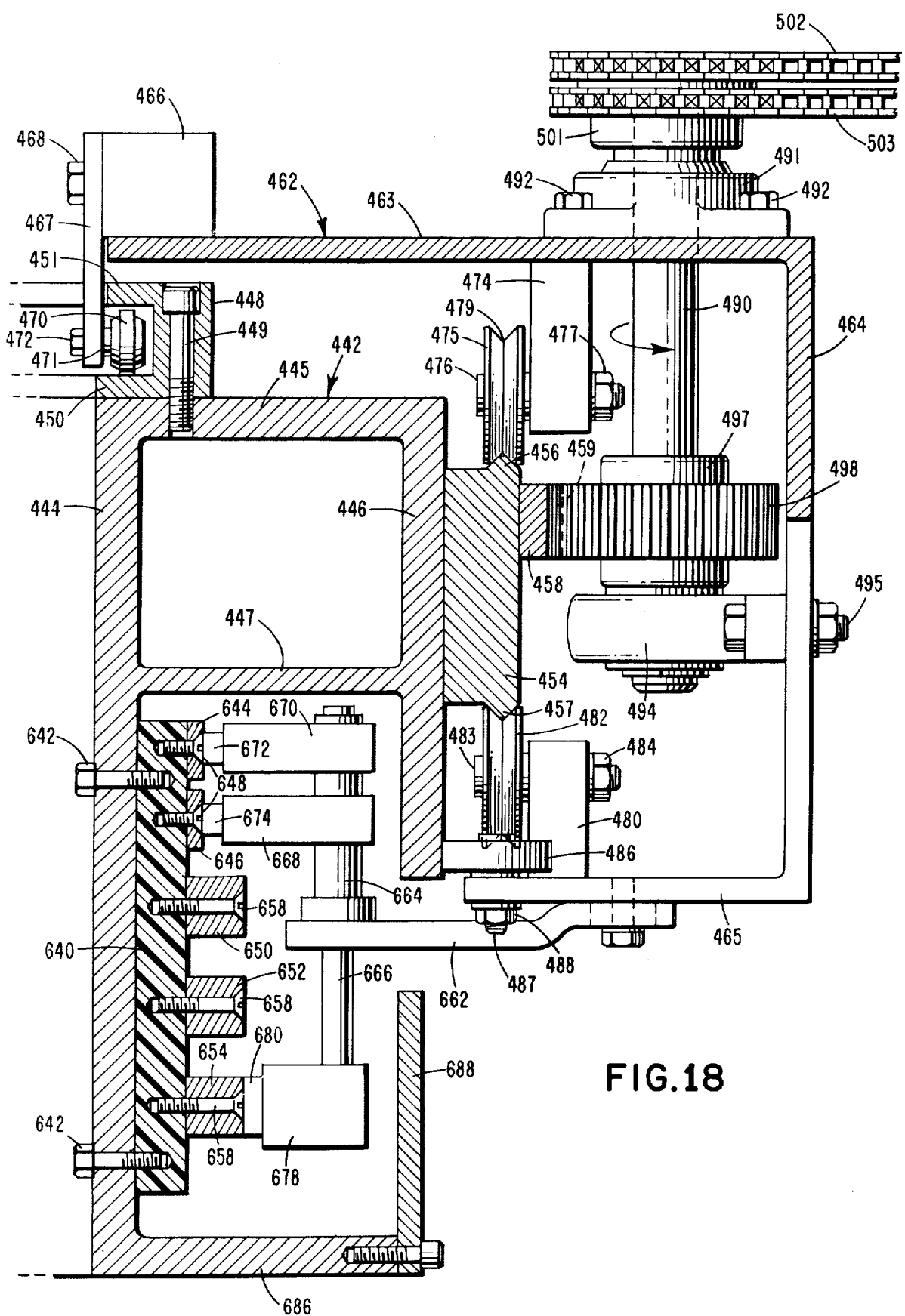
Figure 19:
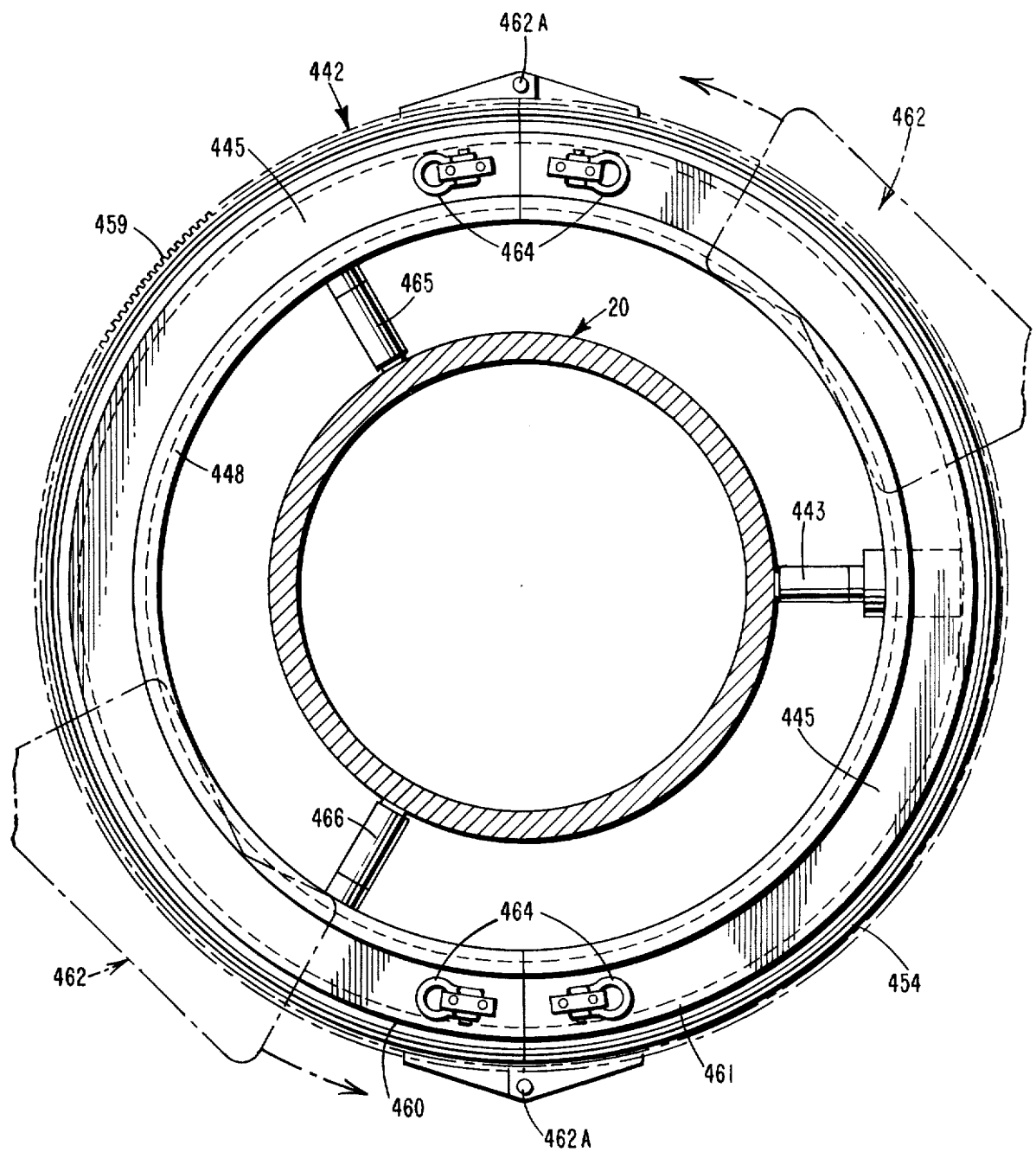
FIG. 19 is a top plan view of the support ring of the embodiment of FIG. 12.
Figure 21:
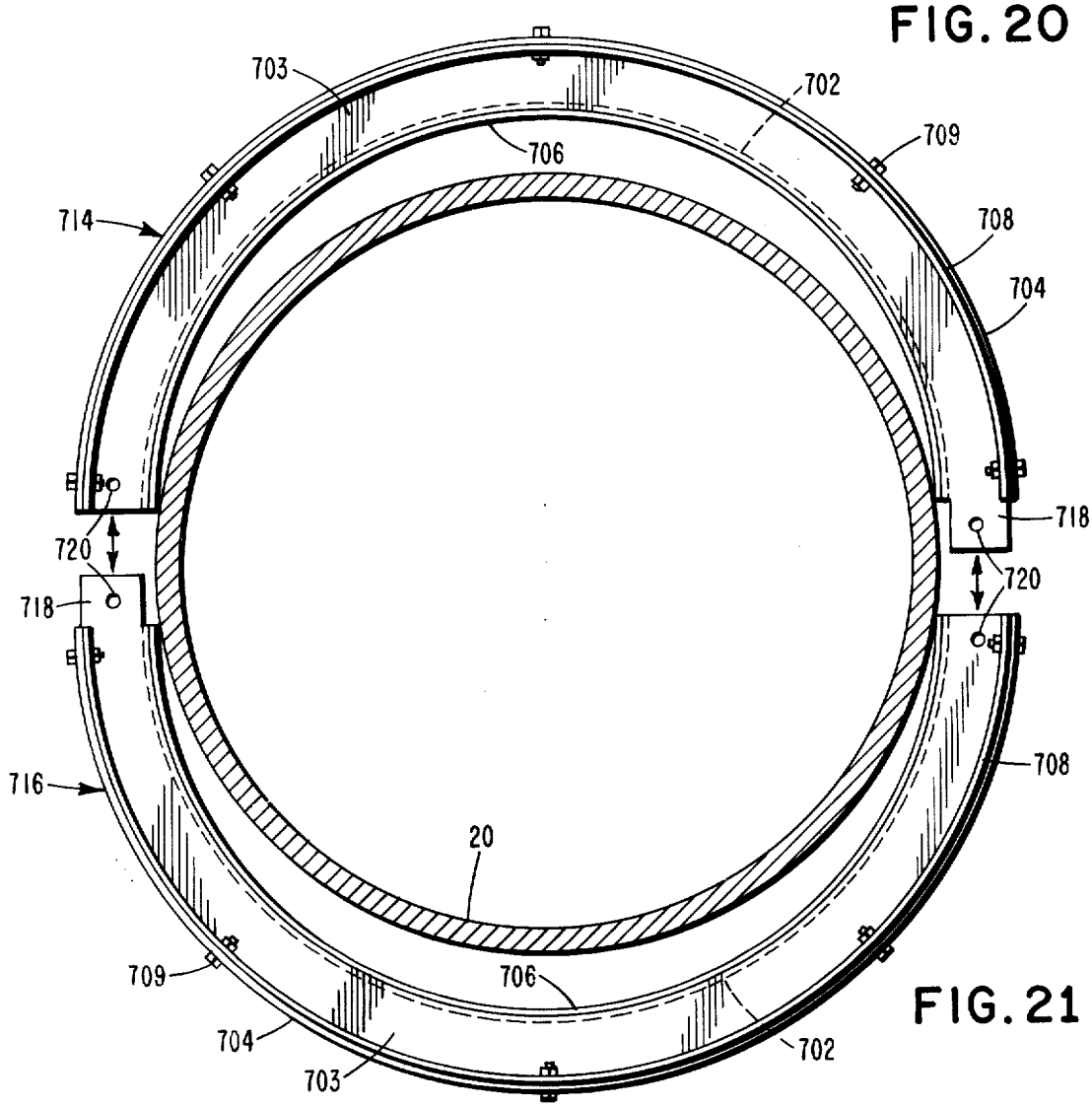
FIG. 21 is a top plan view illustrating the installation of the flux trough of FIG. 20 about the pipe sections.

The third embodiment of the invention is illustrated in FIGS. 12–19. A fragment of the lower section of pipe 20 to be joined to an upper section (not shown) is illustrated in FIG. 12. The upper portion of section 20 terminates in one face 440 of the weld groove designated by the numeral 441. Installed around the entire circumference of pipe section 20, at a point adjacent to weld groove 441, is a support ring 442 which is removably attached to pipe section 20 by a number of clamping bolts 443, one of which is shown. Support ring 442 comprises a number of interrelated elements for supporting, guiding, and driving the carriage upon which the means for depositing weld metal is mounted, and other elements for providing power to the various units which are mounted on support ring 442. Looking now to FIG. 18, support ring 442 has an inner wall 444, a top platform 445 and an outer wall 446. An annular member 447 joins elements 444, 445 and 446 into a box-like cross section to provide the necessary rigidity and strength. Mounted on top platform 445 is an inward-facing U-shaped annular channel track 448, which is fastened to top platform 445 by a plurality of screws 449. The base leg 450 of channel track 448 and the top leg of 451 are adapted to confine therebetween the auxiliary wheels of the carriage, to be described below. Attached to outer wall 446 is annular main track 454 which has V-shaped portions 456 and 457 for engaging the main wheels of the carriage, as below described. Finally, attached to the outer face of track 454 is an annular gear rack 458 having a plurality of teeth 459, which extends around the entire circumference of support ring 442. The lower portion of support ring 442 is of special construction to accommodate the means for supplying electrical power to the various operating units, which are described below. As shown in FIGS. 19 and 21, support ring 442 is comprised of two portions 460 and 461, which are detachable from one another and are connected together by means of pins 462A. Each of the portions 460 and 461 is provided with a pair of shackles 464 to facilitate lifting into position about the pipe sections. A pair of fixed support pins 465 and 466 is provided on portion 460 while an adjustable mounting pin 443 is installed on portion 461.

Support ring 442 serves as the operating platform for at least one weld metal depositing means and its associated equipment, all mounted on a wheeled carriage designated generally as 462.

Each carriage 462 comprises a top plate 463, a side plate 464, and a buttom plate 465. Mounted adjacent one edge of top plate 463 are a pair of wheel mounting blocks 466. Extending downwardly from one face of each wheel block 466 is a wheel mounting bracket 467, which is attached to wheel block 466 by means such as a bolt 468. Rotatably mounted on each wheel bracket 467 is an auxiliary wheel 470 carried by an axle 471 which is attached to wheel bracket 467 by means of a nut 472. Each wheel 470 engages the inside of track 448. Thus, by means of wheels 470, the carriage 462 is interlocked with the ring support 442, and is prevented from tilting with respect to support ring 442 if support ring 442 is at an angle to the horizontal. Wheels 470 also bear part of the weight of carriage 462.

Carriage 462 also is equipped with several sets of main wheels. A number of upper main wheel blocks 474 are attached to the underside of top plate 463 and extend downwardly therefrom. Each upper main wheel block 474 carries a main wheel 475, which is rotatably mounted on an axle 476, attached to wheel block 474 by means of a threaded portion and a nut 477. Each of the main wheels 475 has a V-shaped peripheral groove 479 which engages the upstanding V-shaped portion 456 of the annular guide track 454. Similarly, a number of lower main wheel blocks 480 each carry a lower main wheel 482 attached rotatably thereto by means of an axle 483, having a threaded portion and a nut 484. Each lower main wheel 482 also has a V-shaped peripheral groove 484, which engages the V-shaped portion 457 carried by annular track 454. Each lower wheel block 480 is mounted on bottom plate 465 of carriage 462. Each carriage 462 is installed upon support ring 442 with an interlocking relationship provided by the several opposed pairs of main support wheels 475 and 482, and auxiliary support wheels 470. A plurality of guide wheels 486 are rotatably mounted on bottom plate 465 by means of axles 487 having threaded portions and bolts 488. Guide wheels 486 are perpendicular to the outer wall 446 of support ring 442, and bear against wall 446 as the carriage 462 traverses on the support ring 442.

Each carriage 462 is also provided with an independent carriage drive mechanism. A drive shaft 490 is supported by a top bearing 491 attached by bolts 492 to top plate 463, and a bottom bearing 494 attached to side plate 464 by means of bolts 495. Attached to drive shaft 490 is a collar 497, around which is disposed a circular toothed gear 498, which meshes with the annular gear rack 458 that is carried by support ring 442. Thus, as drive shaft 490 is rotated, carriage 462 is driven around support ring 442. To the upper end of drive shaft 490 is attached a driven sprocket 501, which is engaged by a pair of drive chains 502 and 503.

Figure 15:
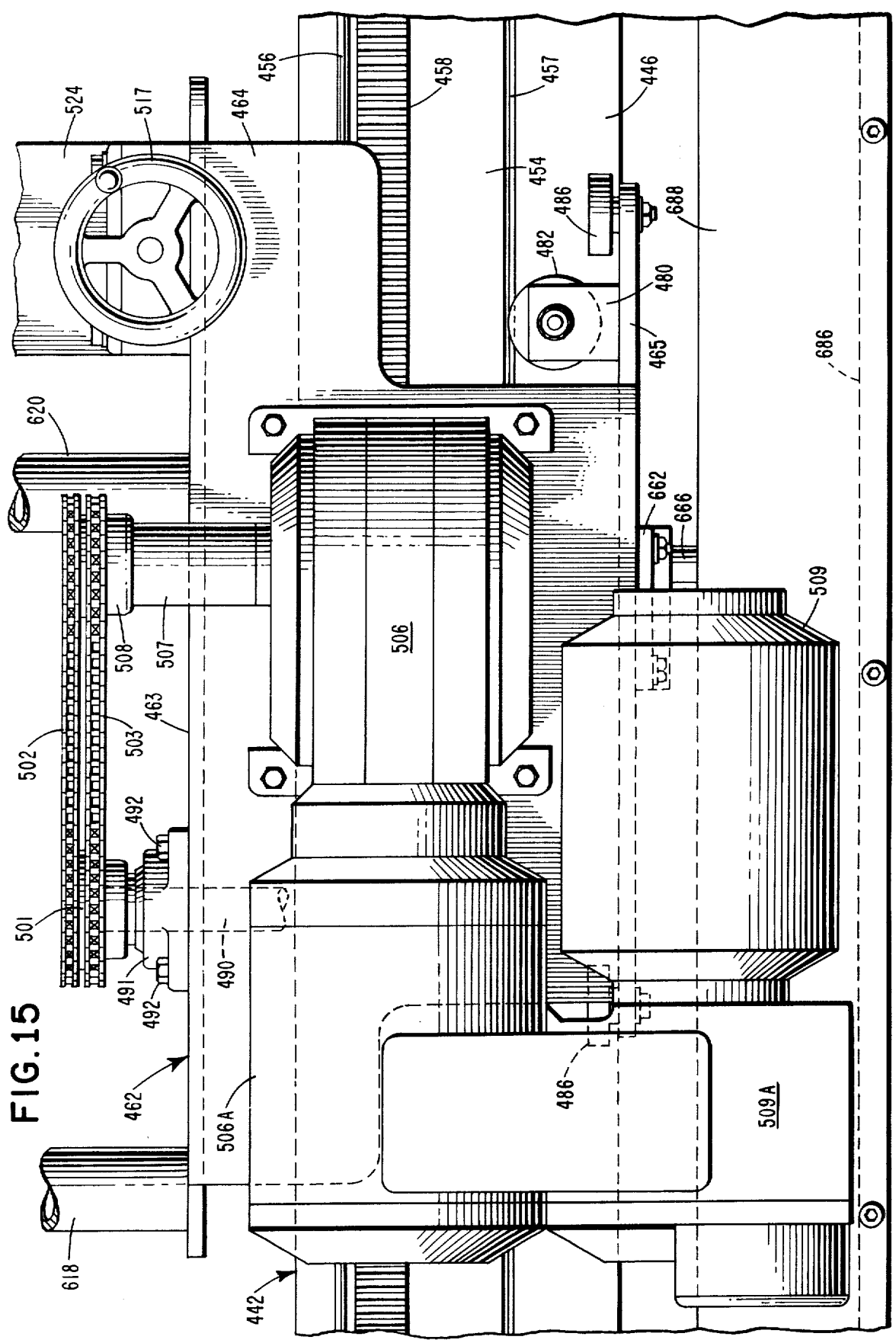
FIG. 15 is a front view of the carriage drive mechanism, taken through line 15—15 of FIG. 13.
Figure 16:
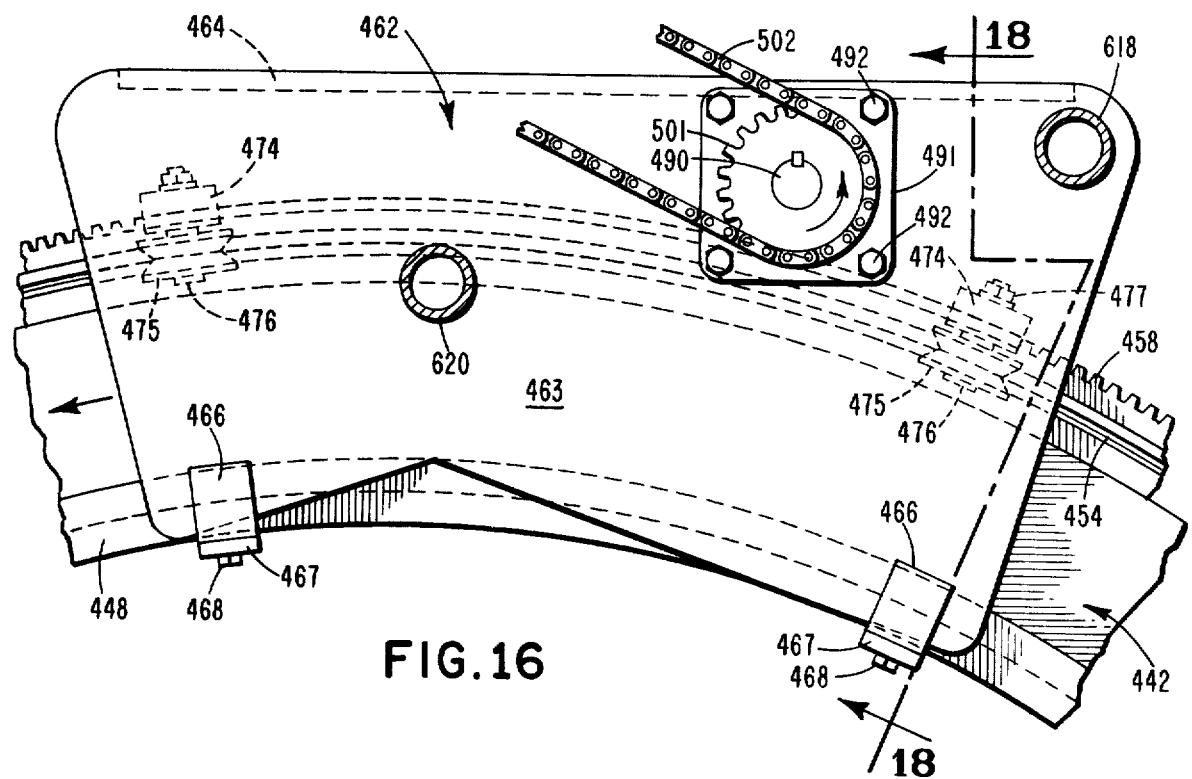
FIG. 16 is a top plan view of the carriage and the support ring of the embodiment of FIG. 12, with the means for depositing weld metal removed.
Figure 17:
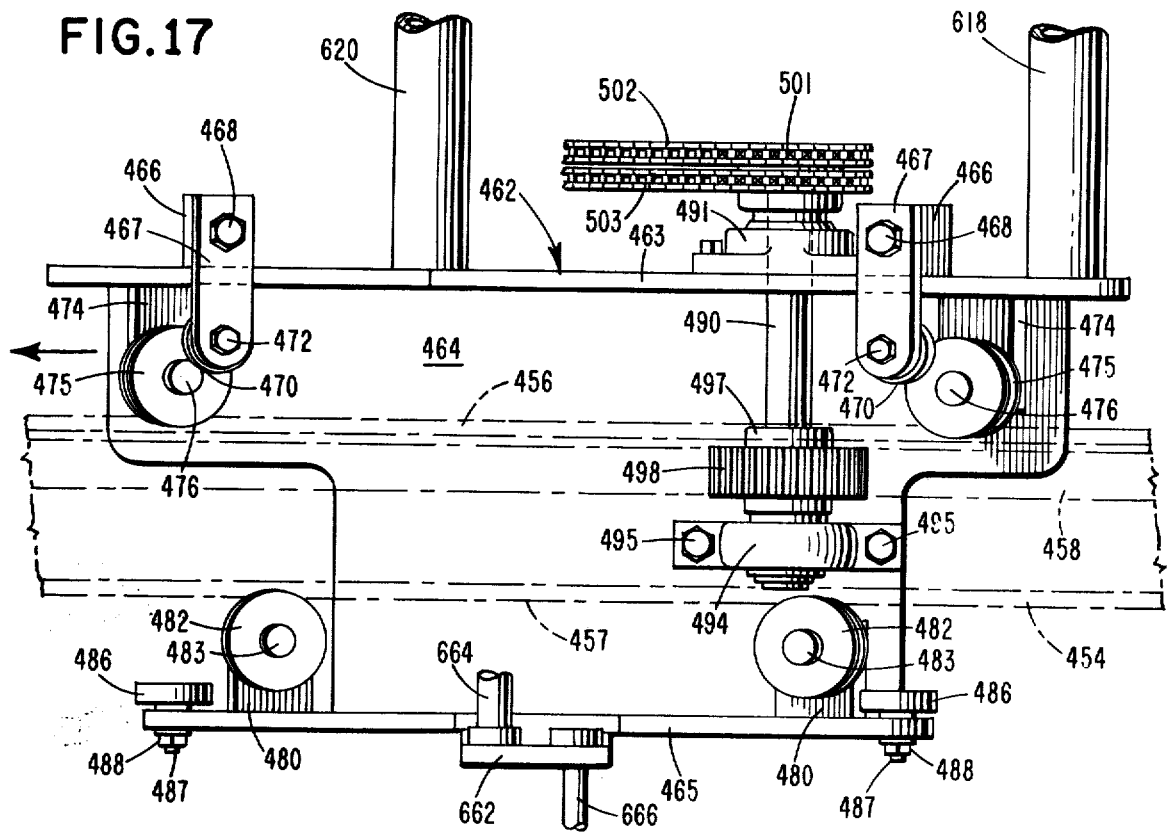
FIG. 17 is a side view of the elements shown in FIG. 16 taken through line 17—17 of FIG. 16.

As best seen in FIG. 15, attached to the front of side plate 464 is a drive transmission 506. Extending outwardly to drive transmission 506 is a driven shaft 507 which carries a double chain drive sprocket 508, which is engaged by chains 502 and 503. Operative interconnected with transmission 506 is a speed reducer assembly 506A, which is in turn connected by means of right-angle drive unit 509A to the electric driving motor 509. Suitable control means (not shown) are provided for controlling the speed of carriage 462, and can be in the form of a control of the electrical power to motor 509, or possibly mechanical means incorporated into transmission 506, reducer 506A, or right-angle unit 509A.

Figure 13:
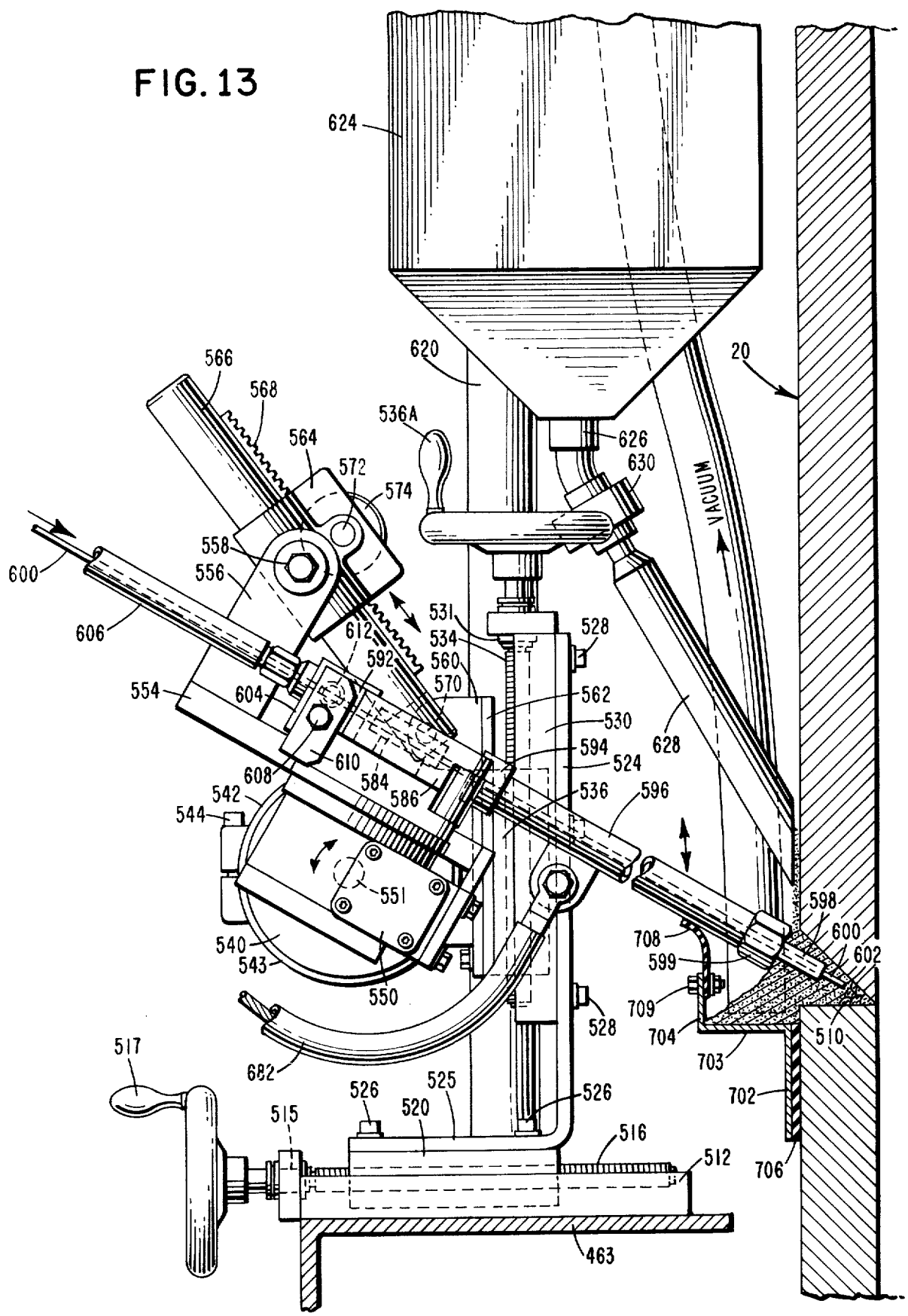
FIG. 13 is a side view of a portion of the embodiment of FIG. 12 taken on line 13—13 of FIG. 12.
Figure 14:
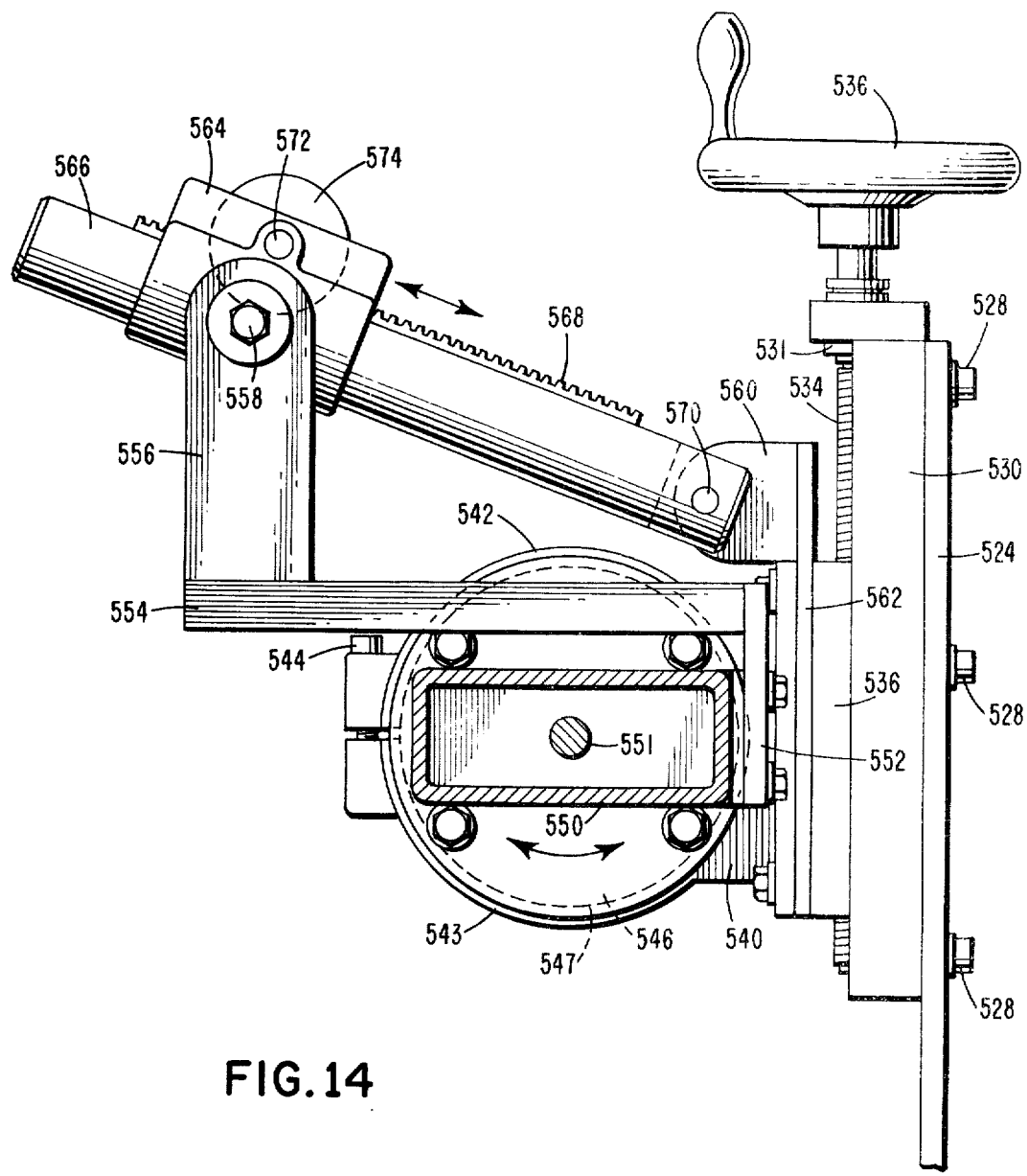
FIG. 14 is a side view of a portion of the welding apparatus of this invention taken through line 14—14 of FIG. 13.

The means for depositing weld metal 510 is mounted on top plate 463, and is best shown in FIG. 13. A first positioning mechanism positions the electrode radially in and out with respect to the pipe sections. A radial slide block 512 is fixedly attached to top plate 463, and contains at its ends shaft bearings 514 and 515, which support a screw shaft 516. Screw shaft 516 is oriented generally radially of the pipe sections, and is in a plane generally perpendicular to the axis of the pipe sections. A handwheel 517 is attached to screw shaft 516. Slidable within a recess in slide block 512 is a radial slide 520, which is provided with a toothed segment (not shown) which meshes with the threads on screw 516 so that when screw 516 is rotated radial slide 520 moves radially and with respect to the pipe sections. This mechanism allows the welding electrode tip to be placed at the desired depth in the weld groove.

A second positioning mechanism, of similar design, positions the electrode vertically with respect to the weld groove. Attached to the upper surface of radial slide 520 is a vertical slide bracket 524, which is L-shaped and has a base portion 525 bolted to radial slide 520 by means of bolts 526. Fastened to vertical slide bracket 524 by means of bolts 528 is a vertical slide block 530, which has an upper bearing 531 supporting a vertical screw shaft 534. Screw shaft 534 is oriented generally parallel to the axis of the pipe sections. A handle 536A attached to its upper end provides the means for rotating vertical screw shaft 534. A vertical slide 536 slidably engages vertical slide block 530 and has in its interior a threaded portion (not shown) that engages the threads of vertical screw 534. This mechanism allows the welding electrode tip to be placed at the desired height level in the weld groove.

The vertical attitude positioning of the welding electrode is provided in this embodiment by novel mechanism for mounting the wire feed motor 546. A motor support plate 540 is attached to vertical slide 536. Extending outwardly from motor support plate 540 is a motor mounting means comprising a pair of motor bracket arms 542 and 543 which together describe a circular opening, and which are connected together at their outer ends by an adjustable screw connection 544. Bracket arms 542 and 543 encircle and hold the weld wire feed motor 546, an electric motor of the conventional circular configuration. Motor 546 can be provided with an annular slot 547 (FIG. 14) which mates with a flange (not shown) carried by the two bracket arms 542 and 543, thus prohibiting lateral movement. Motor 546 is loosely held in motor mounts 542 and 543, so that it can be rotatably positioned with respect to the brackets. Mounted on the front of weld feed wire motor 546 is a transmission 550 which receives the power output from motor drive shaft 551, and changes its direction ninety degrees to engage the weld wire.

A positioning mechanism allows accurate rotation of motor 546. An upstanding rotation bracket 552 is fastened to transmission 550, and a horizontal arm 554 extends outwardly from bracket 552. Upstanding on arm 554 is a clevis 556 within which is a pivot pin 558. Another clevis 560 is attached to vertical slide 536 by means of a clevis plate 562. Pivot pin 558 supports a sleeve 564 within which is received an adjusting rod 566. Attached to the upper portion of rod 566 is a gear rack 568. The end of rod 566 is pivotally attached by means of a pin 570 to clevis 560. A gear, not shown, is carried by a shaft 572, and meshes with gear rack 568. Shaft 572 is rotatable by means of a manual control wheel 574.

Mounted on transmission 550 is a wire feed mechanism, best shown in FIG. 12, which comprises a driven wire feed wheel 582 and an opposed wire feed pinch wheel 584. A housing 586 supports pinch wheel 584 on a shaft 588. Housing 586 is pivotally mounted upon a pivot pin 590. An electrode mounting bracket 594 is also fastened to transmission 550 and a welding electrode 596 extends outwardly therefrom. Electrode 596 is in the form of a cylindrical tube having a central axial opening through which the welding wire passes. Electrode 596 terminates in an electrode tip 598 attached by a nut 599. Welding wire 600 passes through electrode 596 and protrudes from electrode tip 598 a predetermined distance. The welding arc is struck between the pipe section and tip portion 602 of the welding wire. A wire feed support bracket 604 is also mounted on housing 550, and is connected to a wire feed conduit 606. Extending outwardly from bracket 604 is a stud 608 that passes through an opening in flange 592 and is capped by a washer 610. Between washer 610 and flange 592 a coil spring 612 is installed, to exert continuous pressure against flange 592 to urge wire feed wheels 582 and 584 together. The welding wire 600 passes between wheels 582 and 584 and is continuously fed thereby at a predetermined rate.

The horizontal attitude positioning of the welding electrode 596 is provided by another mounting mechanism. Electrode mounting brackets 594 and 604 are attached to a split annular ring 636 which encircles an upstanding shoulder 637 on the top of transmission housing 550. The free ends of ring 636 are closed by a bolt 638. When bolt 638 is loosened, ring 636 can be rotated about the axis of wire drive wheel 582, so that the electrode 596 can be angled toward or away from the direction of carriage movement.

The welding wire 600 is stored on a reel 616 which is rotatably mounted on the top of post 618, which in turn, is fixedly attached to the upper surface of top plate 463. A second upstanding post 620 is fixedly attached to top plate 463. An arm 622 extends outwardly from post 620 and is attached to a flux hopper 624. A flux delivery opening 626 is provided on the bottom of hopper 624 and a flux conduit 628 is connected to opening 626 by a suitable connection means 630. Flux conduit 628 is manually adjustable so that it terminates adjacent to and slightly behind the point of welding and connected to a suitable source of vacuum, not shown, so that the flux can be recycled.

Of course, suitable electrical power must be supplied to carriage drive motor 509, wire feed motor 546, and to the welding electrode 596. It should be noted that the electrical cables connecting these various units to the below described power supply system have not been illustrated in all the drawings, for the sake of clarity.

The power supply system must supply two different types of electrical power, a first type and level for the drive motors and a second type and level for the welding electrode. This power supply system is best shown in FIG. 18. Installed on plate 444 of ring of ring support 442 is an annular insulating sheet 640, which is attached to plate 444 by means of a plurality of screws 642. Mounted on insulating sheet 640 are a first pair of annular bus bars 644 and 646 which are attached by means of screws 648. Bus bars 644 and 646 supply power to the drive motors. Connected to each of bus bars 644 and 646 are electrical cables (not shown) from the remote source of electrical energy for operating carriage motor 509 and the wire feed motor 546. Also attached to insulating sheet 640 are three additional annular bus bars 650, 652, and 654, which are attached by means of screws 658. Each of bus bars 650, 652 and 654 is individually connected by means of electrical cables, not shown, to a source of electrical energy for welding electrode 596. Attached to bottom plate 465 of carriage 462 is an electrode support beam 662 which extends inwardly toward the various bus bars. A first electrode support bar 664 extends upwardly from beam 662 and a second electrode support bar 666 extends downwardly therefrom. Mounted on bar 664 are a pair of insulating blocks 668 and 670, and attached to the ends of each of the insulating blocks 668 and 670 are electrical contactors 672 and 674. Contactors 672 and 674 wipe against, and make electrical contact with, the bus bars 644 and 646 as carriage 462 is moved around the pipe on support ring 442. Contactors 672 and 674 are connected respectively to carriage drive motor 509 and wire feed motor 546 by electrical cables, not shown. Attached to support bar 666 is an insulating block 678, which carries a brush 680, which contacts bus bar 654. Electrical power from brush 680 is communicated to welding electrode 596 by means of an insulated cable 682, a portion of which is shown in FIG. 13. If a plurality of welding units are used on a single support ring 442, each of the electrodes is connected to a separate bus bar 650 and 652. Ring 442 is grounded to pipe 20 through the ring clamping bolts to complete the electrical circuits. In order to provide protection for personnel operating on the apparatus, and some protection from the environment, a lower flange 686 is attached to plate 444, and a shield 688 extends upwardly therefrom, allowing only a small gap through which beam 652 and the various electrical cables pass.

Various controls and indicators for the electrical components of the device can be provided on an electrical console 692 installed on top plate 463. Control for the carriage drive motor is advantageously provided at a point more accessible to the operator. For example, for practicing the method set forth in copending U.S. application 22,161, filed Mar. 24, 1970, it is desirable to alter the drive motor speed, as necessary, during each welding pass, and thus the speed control should be positioned in a location convenient to the operator.

Figure 20:
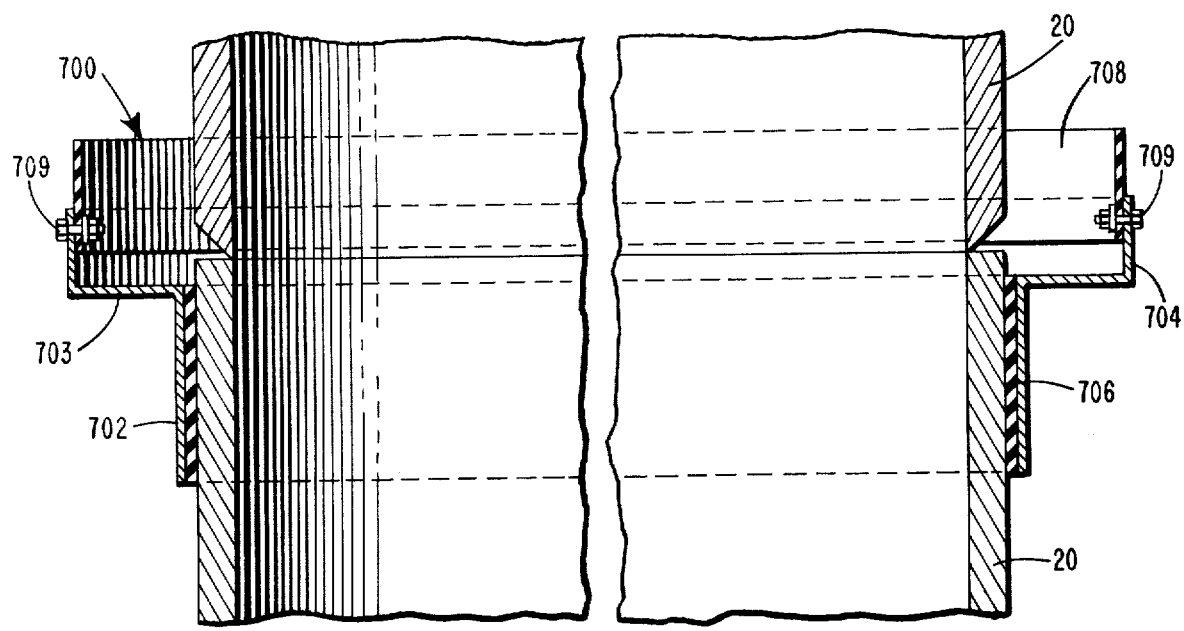
FIG. 20 is a side view of another preferred flux trough having a deformable side portion.

Looking to FIGS. 20 and 21, a novel flux trough of particular utility with regard to the above disclosed welding apparatus is illustrated. As shown in FIG. 20, a pair of pipe sections 20 are placed in end-to-end relationship. An annular flux trough indicated generally as 700 is placed about the lower pipe section 20, adjacent to the weld groove. Flux trough 700 consists of an encircling flange plate 702, a floor 703, and sides 704. Sandwiched between flange 702 and the outer surface of pipe section 20 is a resilient pad 706. Attached to the upper portion of annular side plate 704 is an annular flexible side extension 708. A plurality of bolts 709 attach flexible extension 708 to side 704. It is advantageous to manufacture flux trough 700 to two separate sections designated broadly in FIG. 21 as 714 and 716. These two halves can be joined together by any number of means, such as aligned flanges 718 and openings 720, through which suitable fasteners can be passed. It is also within the concept of the invention to provide adjustable fastening means at each of the joining points. The flux trough 700 is placed about the lower pipe section 20 in such a manner as to fit snugly and compress resilient pad 706 between flange plate 702 and pipe section 20 so that no liquid flux can escape therebetween. The purpose of flexible extension 708 is to provide support for a high level of flux in the flux trough, while not inhibiting the ability to properly position welding electrode 596 in the weld groove. Welding electrode 596 can deform extention 708 downwardly, as necessary (see FIG. 13). This is particularly valuable when welding pipe which is at an angle to the vertical.

The above described positioning mechanisms allow the welding electrode to be moved laterally in two planes and angularly in two planes. These four planes are selected to provide the optimum ability to place the tip portion of the electrode wire at the precise angle and spacing from the pipe or the previously deposited weld metal necessary to accomplish the desired welding. Furthermore, many special situations can be handled by the novel means for establishing the attitude of the electrode. When weld beads are being laid along the lower portion of the weld groove (see FIG. 5), the electrode must be at one vertical attitude, or angle to the horizontal. However, placing beads along the upper portion of the weld groove requires a different vertical attitude. Also, proper placement of beads in special welding grooves such as that shown in FIG. 3 can only be accomplished by an electrode having a full range of lateral and angular movement.

Welding on slightly inclined pipe sections brings with it another problem, for the puddle of molten weld metal tends to run due to gravity not only vertically downwardly but also downwardly along the weld groove. Thus, during a downhill pass the puddle of molten metal tends to run ahead of the point of welding, while during the uphill pass it tends to run back onto the previously welding bead. By this inventive apparatus, the electrode horizontal attitude, or angle to the pipe radius can be set so that the electrode points toward or away from the direction of welding. It can therefore be used to support the puddle of molten metal to some extent. That is, during the downhill pass, the carriage runs ahead of the point of welding, with the electrode angled from an advanced position back into the weld point, thus placing the electrode wire tip portion ahead of the puddle to support the puddle. During the uphill pass, the carriage is set to run behind the weld point, with the electrode angled ahead to place the wire tip portion behind the puddle.

Many variations and modifications of the above described embodiment of the invention may become evident to those skilled in the art. However, it should be understood that the scope of the invention is not defined by the above description, but is governed by the appended claims.

I claim:

1. Apparatus for welding together in end-to-end relationship substantially vertically extending upper and lower pipe sections comprising:

a support ring encircling said lower pipe section and attachable thereto, annular track means carried by said support ring, a wheeled carriage movable on said track means around said pipe sections, carriage drive means mounted on said carriage for moving said carriage around said track means, welding electrode radial positioning means mounted on said carriage for positioning said welding electrode generally radially with respect to said pipe sections, said radial positioning means comprising a radial slide movable generally radially of said pipe sections in a plane generally perpendicular to the axis of said pipe sections and means for moving said radial slide.

welding electrode vertical positioning means for positioning said welding electrode vertically with respect to said pipe sections, said welding electrode vertical positioning means being mounted on said radial slide and comprising a vertical slide movable generally parallel to the axis of said pipe sections and means for moving said vertical slide, welding electrode vertical attitude positioning means for establishing the angular position of said welding electrode with respect to a plane perpendicular to the axis of said pipe sections, said welding electrode vertical attitude positioning means being mounted on said vertical slide and comprising a wire feed motor having a drive shaft, wire feed motor bracket means rotatably holding said wire feed motor to permit rotative movement of said wire feed motor with respect to said wire feed motor bracket means about the axis of said drive shaft, and means for rotatively positioning said wire feed motor with respect to said wire feed motor bracket means, wire feed means attached to said wire feed motor and driven by said wire feed drive shaft, and welding electrode means attached to said wire feed motor and extending toward said pipe sections.

2. The apparatus of claim 8 further comprising a wire feed drive roller driven by said drive shaft and having an axis generally perpendicular to the axis of said drive shaft and horizontal welding electrode attitude positioning means for establishing the angular position of said welding electrode with respect to the radii of said pipe sections, said horizontal attitude positioning means comprising electrode bracket means holding said welding electrode means and rotatably mounted on said wire feed means and to permit rotative positioning of said welding electrode about the axis of said wire feed roller.

3. The apparatus of claim 1 further comprising means interlocking said carriage and said support ring so that said carriage maintains a constant relationship with said support ring regardless of the angle of said pipe sections to the vertical.

4. The apparatus of claim 3 wherein said interlocking means comprises annular track means including first and second oppositely facing track elements and first and second main wheel elements mounted on said carriage and engaging said first and second track elements.

5. The apparatus of claim 4 further comprising an annular channel track having an open side mounted on said support ring and auxiliary wheel means mounted on said carriage and engaging the interior of said channel track through said open side.

6. The apparatus of claim 1 wherein said means for rotatively positioning said wire feed motor comprises first arm means attached to said wire feed motor, second arm means pivotally connected to said vertical slide at a first pivotal connection spaced laterally from said drive shaft, sleeve means movable on said second arm means, said sleeve means being pivotally connected to said first arm means, and means for adjustably positioning said sleeve means on said second arm means thereby to cause rotative movement of said wire feed motor.

7. The apparatus according to claim 1 further comprising an annular electrical power bus bar attached to said support ring and connected to a source of electrical power, and contactor means mounted on said carriage and slidingly contacting said bus bar to receive electrical power therefrom to operate equipment mounted on said carriage.

8. The apparatus of claim 1 wherein said support ring means comprises an annular top plate, an annular inner side plate attached to the inner portion of said top plate, an annular outer side plate attached to the outer portion of said top plate, an annular sidewardly facing U-shaped channel track on said top plate, an annular main track attached to said outer side plate and having a pair of oppositely oriented upper and lower tracks, an annular gear rack, and at least one annular electrical power bus bar, and wherein said carriage means comprises a carriage plate, first wheel means attached to said carriage plate and engageable with the inside of said channel track through said open side, second and third wheel means attached to said carriage plate and engageable respectively with said upper and lower tracks, carriage drive means carried by said carriage plate and including a drive gear engageable with said gear rack, and an electrical contactor attached to said carriage plate and engageable with said electrical bus bar.

9. The apparatus of claim 1 wherein said tracks and said wheel means interlock with one another to preclude lateral movement therebetween.

10. Apparatus according to claim 1 further comprising an annular flux through encircling said lower pipe section adjacent to the point of welding, said flux trough comprising a bottom portion, an upstanding side portion attached to said bottom portion, and an upstanding side portion extension of deformable material attached to and extending upwardly from said side portion, whereby said side portion extension can be deformed by said electrode as said carriage moves around said pipe sections.

11. Apparatus according to claim 1 further comprising a flux trough encircling said lower pipe section adjacent to the point of welding and attached to said lower pipe section, and
- a plurality of legs attached to said flux trough and extending downwardly therefrom, each of said legs terminating in an outwardly extending support ring alignment flange upon which said support ring can be placed, the length of said legs being such that said support ring when installed on said flanges is spaced the desired distance from the point of welding.

12. In a welding apparatus for welding together in end-to-end relationship substantially vertical pipe sections comprising in combination a means for depositing weld metal, a support ring encircling said pipe sections upon which said means for depositing weld metal moves around said pipe sections, and a flux trough disposed around said pipe sections and attached thereto, the improvement comprising:
- a plurality of downwardly extending rods attached to said flux trough, each of said rods carrying an outwardly extending support ring alignment pad spaced a predetermined distance from said flux trough, whereby after said flux trough is attached to said pipe sections alignment of said support ring the proper distance from the ends of said pipes is facilitated by placing said support ring on said pads.

13. Apparatus for welding together in end-to-end relationship substantially vertically extending upper and lower pipe sections comprising:
- a support ring for encircling said lower pipe section,
- annular carriage track means carried by said support ring,
- a carriage movable on said track means around said pipe sections,
- weld metal depositing means mounted on said carriage and including welding electrode means,
- a wire feed motor having a drive shaft driving wire feed means attached to said wire feed motor, said welding electrode means being carried by said wire feed means,
- welding electrode vertical attitude positioning means for establishing the angular relationship of said welding electrode means with respect to a plane perpendicular to the axis of said pipe sections, said vertical attitude positioning means comprising wire feed motor bracket means rotatably holding said wire feed motor to permit rotative positioning of said wire feed motor with respect to said wire feed motor bracket means about the axis of said drive shaft, and
- welding electrode horizontal attitude positioning means on said carriage and acting on said welding electrode means for establishing the angular relationship of said welding electrode means with respect to the radii of said pipe sections.

14. The apparatus of claim 13 wherein said wire feed means comprises a wire feed roll driven by said drive shaft and having an axis perpendicular to the axis of said drive shaft, and wherein said horizontal attitude positioning means comprises an electrode bracket holding said welding electrode means and rotatably mounted on said wire feed means to permit rotative positioning of said welding electrode means about the axis of said wire feed roller.

15. Apparatus for welding together in end-to-end relationship substantially vertically extending upper and lower pipe sections, comprising:
- a support ring for encircling said lower pipe section,
- means for attached said support ring to said lower pipe section in fixed relationship thereto,
- annular carriage track means carried by said support ring,
- a carriage movable on said track means around said pipe sections,
- weld metal depositing means mounted on said carriage and including welding electrode means,
- welding electrode radial positioning means on said carriage for moving said welding electrode means with respect to said carriage and said pipe sections to position said welding electrode means radially with respect to said pipe sections,
- welding electrode vertical positioning means on said carriage for moving said welding electrode means with respect to said carriage and said pipe sections to position said welding electrode means axially with respect to said pipe sections,
- welding electrode vertical attitude positioning means on said carriage for moving said welding electrode means with respect to said carriage and said pipe sections to establish the angular relationship of said welding electrode means with respect to a plane perpendicular to the axis of said pipe sections,
- welding electrode horizontal attitude positioning means on said carriage for moving said welding electrode means with respect to said carriage and said pipe sections to establish the angular relationship of said welding electrode means with respect to the radii of said pipe sections,
- said radial positioning means being mounted directly on said carriage, said vertical positioning means being carried by said radial positioning means, said vertical attitude positioning means being carried by said vertical positioning means, said horizontal attitude positioning means being carried by said vertical attitude positioning means, and said welding electrode means being carried by said horizontal attitude positioning means.

* * * * *